(12) United States Patent
Pedersen et al.

(10) Patent No.: US 10,598,154 B2
(45) Date of Patent: Mar. 24, 2020

(54) WIND TURBINE TOWER

(71) Applicant: Vestas Wind Systems A/S, Aarhus N. (DK)

(72) Inventors: Gunnar K. Storgaard Pedersen, Skjern (DK); Børge Øllgaard, Esbjerg (DK); Søren P. Jensen, Varde (DK); Casper Lyngsø, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 16 days.

(21) Appl. No.: 15/543,256

(22) PCT Filed: Dec. 16, 2015

(86) PCT No.: PCT/DK2015/050397
§ 371 (c)(1),
(2) Date: Jul. 13, 2017

(87) PCT Pub. No.: WO2016/116107
PCT Pub. Date: Jul. 28, 2016

(65) Prior Publication Data
US 2018/0003158 A1 Jan. 4, 2018

(30) Foreign Application Priority Data
Jan. 21, 2015 (DK) .................. 2015 70033

(51) Int. Cl.
*F03D 7/00* (2006.01)
*F03D 13/20* (2016.01)
(Continued)

(52) U.S. Cl.
CPC ............. *F03D 13/20* (2016.05); *E04H 12/20* (2013.01); *E04H 12/342* (2013.01);
(Continued)

(58) Field of Classification Search
CPC ....... E04H 12/20; E04H 12/342; F03C 13/20; F03D 13/20; F03D 13/10; F03D 13/40;
(Continued)

(56) References Cited

U.S. PATENT DOCUMENTS 1,316,895 A  9/1919 Houff
4,979,871 A * 12/1990 Reiner .................... F03D 3/068
                                                          415/4.2

(Continued)

FOREIGN PATENT DOCUMENTS

CA          2418021     *  8/2004
DE    102014100814 A1     3/2015
(Continued)

OTHER PUBLICATIONS

European Patent Office, International Search Report and Written Opinion in PCT Application No. PCT/DK2015/050397, dated Mar. 10, 2016.

(Continued)

*Primary Examiner* — Joshua J Michener
*Assistant Examiner* — James J Buckle, Jr.
(74) *Attorney, Agent, or Firm* — Wood Herron & Evans LLP

(57) ABSTRACT

A wind turbine tower configured to support a wind turbine nacelle and a rotor, and with a tower wall of an inner surface and an outer surface. The tower is tethered by a number of cables, each cable extending between a first end anchored to an anchoring element and an opposite, second end attached to the tower at an attachment element. Two cables extending from two different anchoring elements are attached to the tower such that longitudinal projection lines from the second ends of the two cables converge at a convergence point, which lies at a location at a certain height and inside the tower wall thickness. Alternatively, the convergence point (Continued)

lies inside the tower within a distance of three wall thicknesses from the wall inner surface as measured at the height and in a direction perpendicular to the central longitudinal axis of the tower. The invention further relates to a method of erecting a wind turbine tower tethered by cables and configured for supporting a rotor assembly, and wherein the tower comprises a number of tower sections joined to each other. The method comprises positioning a first tower section, attaching at least some of the tethering cables to a second tower section while the second tower section is on the ground, lifting the second tower section with the attached cables onto the first tower section, and joining the second tower section to the first.

17 Claims, 6 Drawing Sheets

(51) Int. Cl.
  *E04H 12/20* (2006.01)
  *E04H 12/34* (2006.01)
(52) U.S. Cl.
  CPC ....... *F05B 2240/917* (2013.01); *Y02E 10/726* (2013.01); *Y02E 10/728* (2013.01)
(58) Field of Classification Search
  CPC . F05B 2240/917; E02D 27/425; Y02E 10/72; Y02E 10/728
  USPC .......................................................... 52/148
  See application file for complete search history.

(56) References Cited

U.S. PATENT DOCUMENTS

| | | | | |
|---|---|---|---|---|
| 6,979,175 | B2* | 12/2005 | Drake | F03D 1/00 416/11 |
| 7,683,498 | B2* | 3/2010 | Stommel | F03D 7/02 290/44 |
| 8,083,212 | B2* | 12/2011 | Numajiri | B66C 1/108 254/278 |
| 8,341,918 | B2* | 1/2013 | Jolly | E04H 12/34 52/745.11 |
| 8,464,497 | B2* | 6/2013 | Lambert | E04H 12/20 52/745.17 |
| 8,544,237 | B2* | 10/2013 | Zillmer | B66C 23/18 52/745.17 |
| 8,544,923 | B2* | 10/2013 | Inda | B66C 1/66 294/215 |
| 8,595,931 | B2* | 12/2013 | Riddell | B66C 1/108 29/889.6 |
| 8,596,614 | B2* | 12/2013 | Numajiri | F03D 80/50 254/329 |
| 9,388,599 | B2* | 7/2016 | Homsi | F03D 13/20 |
| 9,657,495 | B2* | 5/2017 | Lockwood | E04H 12/342 |
| 9,869,293 | B2* | 1/2018 | Nielsen | F03D 80/82 |
| 2005/0151376 | A1* | 7/2005 | Bernhoff | F03D 3/005 290/44 |
| 2010/0319983 | A1* | 12/2010 | De Abreu | E04H 12/20 174/45 TD |
| 2011/0016804 | A1 | 1/2011 | Howard et al. | |
| 2016/0168815 | A1* | 6/2016 | Kemp | E04H 12/20 52/157 |

FOREIGN PATENT DOCUMENTS

| | | |
|---|---|---|
| WO | 2012024608 A2 | 2/2012 |
| WO | 2014033332 A1 | 3/2014 |
| WO | 2014141911 A1 | 9/2014 |

OTHER PUBLICATIONS

Danish Patent and Trademark Office, Search Report in PA 2015 70033, dated Aug. 24, 2015.
European Patent Office, Search Report in EP Application No. 19158860.7, dated Jul. 23, 2019.
Fred Teichman, Engineer Training Series—Guyed Towers, Apr. 30, 2014 (Apr. 30, 2014), XP05604229 [retrieved on Jul. 10, 2019].
Whitham D. Reeve, Cohoe Radio Observatory, Alaska—Part 3, Guyed Tower Installation, Dec. 31, 2014 (Dec. 31, 2014), XP055604094, Retrieved from the Internet: URL:http://www.reeve.com/Documents/Cohoe/Documents/Reeve_CohoeTowerInst.pdf [retrieved on Jul. 10, 2019].

* cited by examiner

WIND TURBINE TOWER

FIELD OF THE INVENTION

The present invention relates to a wind turbine tower configured to support a wind turbine nacelle and a rotor, and wherein the tower is tethered by a number of cables extending between anchoring elements and attachment elements at the tower. The invention further relates to a method of erecting a wind turbine tower.

BACKGROUND OF THE INVENTION

A traditional tower for a wind turbine is a tubular steel tower with tower section placed on top of each other fixed to a concrete foundation. Due to transport and production restrictions, the external diameter has a limited size. Therefore often the shell thickness is seen as the primary dimensioning parameter when increasing the tower height.

Simply increasing the tower shell thickness is however a very ineffective way of achieving increased bearing capacity and stiffness as these parameters only grow linear with the shell thickness. In comparison, increasing the diameter of the tower yields an increased bearing capacity with the diameter in the power of two, and a stiffness growing with the diameter in three.

To overcome the size limitation problem some towers comprises a number of tower sections divided by vertical joints if the diameter is optimized or further tower sections placed on top of each other if the shell thickness in increased and thereby exceed the tower section weight limitation. Other towers have increased bearing capacity by having a lower part constructed of in situ concrete or concrete elements.

Alternatively or additionally, the bearing capacity of a wind turbine tower can be increased and the stresses reduced in parts of the tower by installing a number of cables or wires from a number of anchors or foundations to attachment points in the tower. The cables provide stability to the tower to reduce oscillations from wind and reduces the loads in the part of the tower below the cables considerably. This so-called guyed or tethered tower will to some extent be de-loaded by the wire reactions and can thereby potentially be constructed by fewer long sections with a relatively smaller and thereby more transportable diameters.

However, the tethered tower inevitably takes up more land which has to be taken into account in planning the wind turbine and especially during erection and maintenance of the turbine where the cables needs to be taken into account and may be very much in the way. Also, the tensioning and the attachments of the cables are crucial for the wind tower to withstand the varying and potentially high wind forces which in the interacting with the rotor creates complex and at times quite extreme dynamic loads.

OBJECT OF THE INVENTION

It is therefore an object of embodiments of the present invention to overcome or at least reduce some or all of the above described disadvantages of the known wind turbine towers by providing a tower with improved cable attachments.

It is a further object of embodiments of the invention to provide a cable attachment system which more effectively aid in taking up the static and dynamic loads on the wind turbine tower and to reduce the oscillations of the tower.

It is a yet further object of embodiments of the invention to provide a method for erecting such guyed wind turbine tower which is simple and relatively fast to effectuate and with improved handling of the cables during erection.

So, in a first aspect the present invention relates to a wind turbine tower configured to support a wind turbine nacelle and a rotor, said tower having a generally cylindrical tower wall and extending in a longitudinal direction along and about a central longitudinal axis;
wherein said tower wall has an inner surface and an outer surface; and
wherein a tower wall thickness extends between said inner surface and said outer surface in a radial direction from said central longitudinal axis;
wherein said tower is tethered by a number of cables;
wherein each cable extends between a first end anchored to an anchoring element and an opposite, second end attached to said tower at an attachment element; and
wherein two cables extending from two different anchoring elements are attached to the tower such that longitudinal projection lines from said second ends of two said cables converge at a convergence point; and
wherein said convergence point lies at a location at a height and inside the tower wall thickness or inside the tower within a distance of three wall thicknesses from the wall inner surface as measured at the height and in a direction perpendicular to said central longitudinal axis.

By the proposed arrangement of the cables in sets of two of converging projection lines and with the mentioned location of the convergence point of the projection lines is advantageously obtained that the bending moment in the tower shell caused by the cables is greatly reduced. As a pair of cables is attached such as to converge in a point within the wall thickness or within the relatively short distance therefrom, the forces from each cable in a pair as seen in a horizontal plane will be partly equalized or taken up primarily by a normal force in the tower shell. In this way the stresses are taken up by the tower shell primarily in tension and compression rather than in bending thereby obtaining a much improved load distribution in the tower section where the cables are attached and increasing the stiffness and strength of the tower considerably.

The cables may each be single element cables or mooring lines, tie rods, and/or each comprise a number of wires such as multi strand type wires consisting of a number of strands each consisting of a number of wires, where the wires can be arranged in parallel side by side, bonded, twisted, or braided or combinations hereof. The cables may be made of steel and/or other materials such as Kevlar.

The anchoring element could be placed on or into the ground or seabed, or could alternatively be attached to or form a part of another construction such as floating platform, depth anchors, or another tower foundation etc.

The term 'converge' in this context means that the projection lines of the cables intersect or converge to their smallest separation distance. The longitudinal projection line from an end of a cable corresponds to the direction that the cable extends in at that end. The longitudinal projection line may be the same line as the direction of extension of the cable if the cable is approximately straight. A cable may be anchored solely at the anchoring element and at the attachment element or may be supported or attached in one or more points along its length for example by connection to other cables or stiffeners. In that case the longitudinal direction of the cable may change along its length and the longitudinal projection line from said second end then corresponds to the cable longitudinal direction in or near that end.

The wind turbine tower may comprise one or more tower sections joined to form the generally cylindrical tower wall. The wind turbine tower in one embodiment is made at least partly of steel and/or concrete, and may be reinforced in places by other or additional materials.

The tower may be self-supporting both with and without the cables attached. The tower may alternatively be self-supporting only with the cables attached and tensioned. In such case the tower may be temporarily stiffened or supported by a temporary support during erection until the cables are attached.

One or more of the cables may be attached to the tower at essentially the same height or at different heights. In one embodiment the cables are all attached at the same height and at even intervals around the tower to thereby distribute the forces from the cables evenly. By attaching the cables at the same height, the cables can be attached to attachment elements attached to the same tower section. This tower section may form a special tower section specially adapted to receive the cables for example by comprising additional reinforcement compared to its neighbouring tower sections and/or by have higher strength or stiffness. Similarly, the tower may be tethered by more cables or more sets of cables attached at different heights of the tower.

According to the invention, the convergence point lies at a location within the tower wall thickness or inside the tower within a distance of three time the wall thickness. The wall thickness here is then as mentioned the wall thickness of the tower wall at the height of the convergence location. Also, the distance is here as mentioned determined based on the local tower wall thickness at that height. As the location of the convergence point is relatively close to or adjacent the attachment element, the tower wall thickness is in most applications the same or approximately the same as the local tower wall thickness adjacent the relevant cable attachment elements.

In an embodiment of the invention the two cables are attached to the tower such that the convergence point lies at a location inside the tower wall thickness or inside the tower within a distance of one wall thickness from the wall inner surface measured at the height and in a direction perpendicular to said central longitudinal axis. By a location of the convergence point closer to the wall inner surface is obtained an improved load transfer from the cables to the tower wall with reduced bending moments in the tower wall. This effect is even more pronounced when the convergence point lies inside the wall thickness. Hereby the tower wall thickness adjacent to the convergence point and the cable attachments can be reduced without jeopardizing the strength of the tower. Furthermore, by having the convergence point inside the wall thickness or inside the tower is avoided that the cables are physically close to crossing or touching. This simplifies the attachment and tensioning of the cables to the attachment elements. Furthermore, this allows for the attachment elements to be arranged totally on the outside of the tower if desired and thereby not interfering in the internal tower design. At the same time, components of the forces from each cable in a pair will to a large extent or completely counteract each other such that the stresses are taken up by the tower shell primarily in tension and compression rather than in bending.

In an embodiment of the invention, the attachment element forms an integral part of the tower wall or is attached to a surface of the tower wall by fastening means such as any of welding, gluing, or mechanical fastening members.

According to an embodiment of the invention, the attachment element is adapted to receive the second ends of the two different cables. Hereby a reduced number of attachment elements are needed to attach the cables in that each or some of the attachment elements can be used to attach two cables. Further is obtained a more precise attachment of the two cables relative to each other in that they are attached to the same attachment element. In this way the location of the convergence point of the projection lines of the two cables can be more easily and precisely determined and controlled. Such attachment element can be at least partly formed from a bended plate, which provides for a simple yet effective way to construct an attachment element of high strength and stiffness and wherein the attachment of the cables can be controlled such that the convergence point of the projection lines of the two cables attached to the attachment element will lie as desired within the wall thickness or close to the inner tower wall.

In an embodiment of the wind turbine tower, two cables are anchored to the same anchoring element and extend to different positions at the tower at essentially the same height of the tower. In this way one anchoring elements can be used to anchor two cables.

In an embodiment, the wind turbine comprises a number of anchoring elements and a number of attachment elements, and each anchoring element is adapted to anchor at least two cables and each attachment element is adapted to receive two cables not extending from the same anchoring elements. Hereby is obtained a tethering of the tower wherein the cables are attached in pairs to each anchor and attached in other pairs to the tower. For example, the wind turbine tower may be attached by 6 cables extending between 3 anchoring elements and 3 attachment elements. Hereby is obtained that any cable can be detached from an attachment element or from an anchoring element for example for repair or exchange without jeopardizing the stability of the wind turbine tower. Also, any set of two cables can be detached from an attachment element or from an anchoring element with the tower still being suspended to some degree in all directions. This would then make room to allow for example for a crane to be moved close to the tower without interfering with any of the remaining cables, for a wind turbine blade to be lowered to the ground or similar.

In an embodiment of the invention, each cable is pre-tensioned to a value in the interval of 30-55% of their nominal strength, such as in the interval of 40-50% of their nominal strength. Hereby is obtained that all the cables tethering the wind turbine tower are in tension at all times and under all weather conditions regardless also those cables in the leeside. Hereby the oscillations of the tower and the natural frequency of the tower remain well controlled. By tensioning the cables to such high degree, the non-linear part of the deflection of each cable will have only an insignificant influence. Hereby, the cable deflection will have a working interval where the deviation from the linear behaviour is kept below a certain low value, say 2%. With a mainly linear behaviour of the cables is obtained that all deflections within the working interval and in all directions are linear and that the system frequency of the tethered tower has advantageously just one single value. Hereby only a limited frequency range has to be excluded from the operational parameters of the wind turbine which is important in order to be able to optimize the power production in all weather conditions.

In an embodiment of the invention, the wind turbine tower comprises at least a first tower section and a second tower section joined to the first tower section wherein the cables are attached to the second tower section and wherein the tower wall thickness of the second tower section is larger than the tower wall thickness of the first tower section. Hereby is obtained that the tower section receiving the cables has an increased stiffness and better can withstand the loads from cables. Further, by attaching the cables to second tower section is obtained that the second tower section of increased thickness and specially prepared to receive the cables can be made separately from the other tower sections. The first tower section may be placed on top of and above the second tower section or vice versa. Also, the tower may comprise more tower sections, and the first tower section may form an intermediate tower section placed in between other tower sections.

Further, the second tower section according to the above can have an outer diameter larger than an outer diameter of the first tower section, whereby can be achieved a second tower section of increased stiffness and strength for better withstanding the loads from the cables. This may be obtained with the first and second tower section having the same inner diameter thereby obtaining an even inner surface of the tower across the first and second tower sections which may be desirable to simplify the attachment of inner ladders etc.

Further, the second tower section according to the above can have an inner diameter smaller than an inner diameter of the first tower section likewise to yield an increased stiffness and strength of the tower section. This may be obtained with the first and second tower section having the same outer diameter thereby obtaining an even outer surface of the tower across the first and second tower sections.

The first and second tower sections may be joined by any of a flange connection, welding of adjoining or overlapping tower section portions, or bolting of overlapping tower section portions to hereby obtain a strong connection between the two tower sections.

In an embodiment, the cables are attached to a tower ring placed around the wind turbine tower. The tower ring may be attached to the wind turbine tower by welding or by being tightened around the tower or by combinations hereof. Hereby is obtained a strong attachment of the cables to the tower with an efficient load transfer from the cables to the tower.

According to further aspect, the invention relates to a method of erecting a wind turbine tower tethered by a number of cables and configured to support a wind turbine nacelle and a rotor, and wherein the tower comprises a number of tower sections joined to each other, the method comprising: positioning a first tower section, attaching at least some of the tethering cables to a second tower section while the second tower section is on the ground, lifting the second tower section with the attached cables onto the first tower section, and joining the second tower section to the first. Hereby is obtained a method for erecting a tethered tower where the tower sections are mounted successively and where on the same time the cables are handled and managed effectively during the erection. By the proposed method, the cables are advantageously attached to the tower section while at the ground which can be done far more reliably, simple, fast, and safely than if to be done in height, where also the weather conditions may complicate the work considerably. Also, the method advantageously provides for a way to lift the cables in position at height at the same time and in the same process as the lifting of the second tower section thereby only needing to perform one lifting operation by a crane and reducing the need for the crane. This is of concern especially for the erection of offshore wind turbines. Furthermore by the proposed method is obtained that some or optionally all of the cables are ready to be mounted to the anchoring elements and to be tensioned to support the tower already when having joined the first and second tower sections. In this way the tower can be tethered as soon as possible. Further advantages are as mentioned in the previous in relation to the tethered tower.

The term on the ground is here to be understood in a general meaning as a base of some sort like for example a foundation, solid ground, a platform etc., such as an offshore foundation or a floating platform in the case of erecting a tower for an offshore wind turbine.

In an embodiment of the invention a third tower section is attached to the second tower section while the second tower section is on the ground. Hereby as much work as possible is performed at the ground under far better working conditions than if performed in height. Hereby a better quality of the attachment may be obtained and the work may be performed faster and while having a far better safety.

BRIEF DESCRIPTION OF THE DRAWINGS

In the following different embodiments of the invention will be described with reference to the drawings, wherein.

DETAILED DESCRIPTION OF THE DRAWINGS

Figure 1:
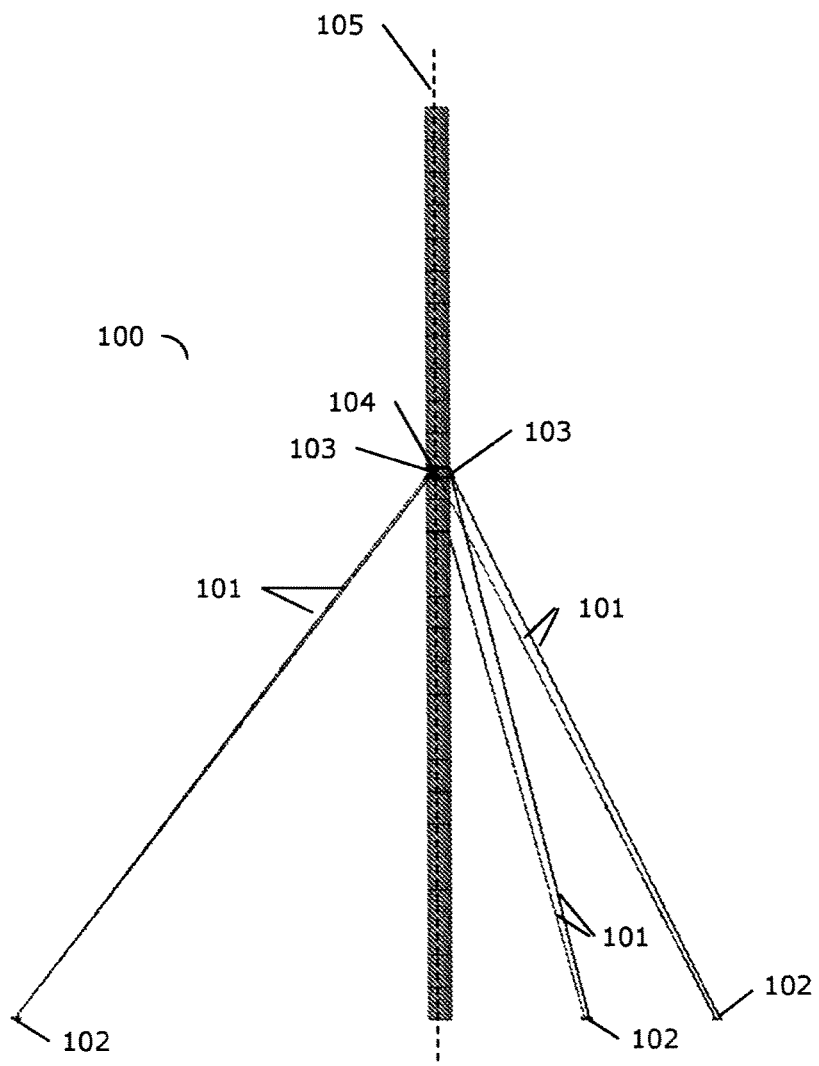
FIG. 1 shows a sketch of a wind turbine tower according to an embodiment of the invention.

FIG. 1 shows a sketch of a wind turbine tower 100 according to an embodiment of the invention. The wind turbine tower is configured to support a wind turbine nacelle and a rotor (not shown) and is tethered by a number of cables, 101. The tower extends in a longitudinal direction along and about a central vertical longitudinal axis 105. In the present embodiment, in total six different cables 101 extend between their first ends attached to in total three different anchoring elements 102 which here are on the ground and their second ends attached to attachment elements 103 at one tower section 104 of the tower. Two cables extend from each anchoring element and extend in different angles to two different attachment elements at the tower but at the same height. In this embodiment the anchoring elements 102 are placed at the same distance from the tower and at 120 degrees apart around the tower so that the cables tensioning is symmetrical. The cables here extend to the tower at an angle of approximately 45 degrees and are attached to the tower at a height just beneath the height of wind turbine blade tip when in its lowermost position. In this way the cables cannot under any weather conditions be hit by a blade.

Figure 2:
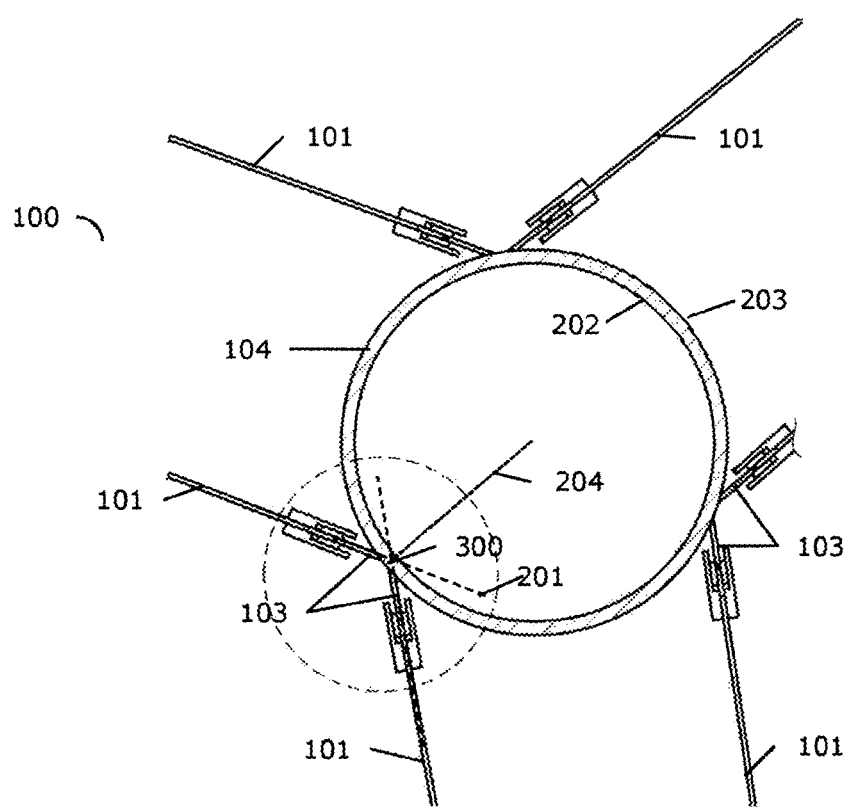
FIGS. 2 and 3 show the attachment of cables to a tower section in a cross sectional view and an enlargement of a detail hereof, respectively, FIGS. 4A and B show an embodiment of the cables attached to a tower section in two different views.
Figure 3:
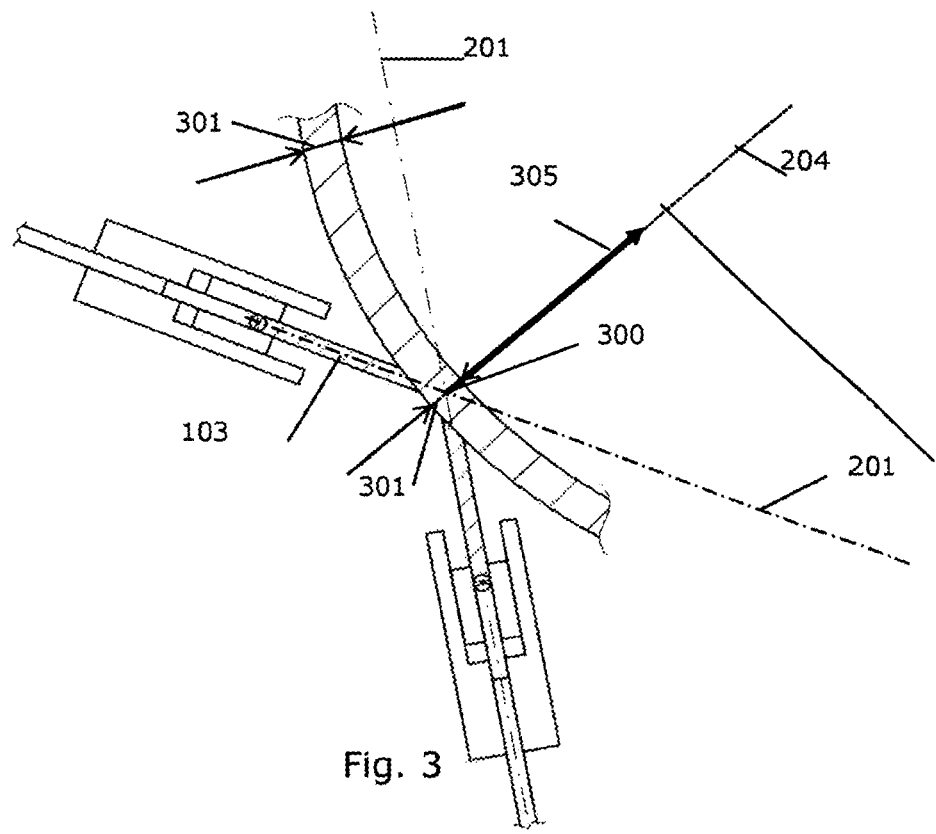

FIG. 2 shows a cross sectional view of the wind turbine tower 100 of FIG. 1 and at the height where the cables 101 are attached to attachment elements 104. A part hereof is shown in an enlargement in FIG. 3. The six cables 101 are attached in pairs to three anchoring elements as shown in FIG. 1, and are attached to meet in other pairs at the tower. Hereby is obtained the symmetrical tethering of the tower as sketched in FIG. 2.

The longitudinal projection lines 201 from the second ends of a pair of cables 101 converge at a convergence point 300. The convergence point lies at a location at some height and in this embodiment inside the tower wall thickness 301 extending between the inner surface 202 and the outer surface 203 in a radial direction 204. The location of the convergence point 300 may in other embodiments lie inside the tower and within a distance of three wall thicknesses from the wall inner surface 201 as measured at the height of the location of the convergence point and in a direction perpendicular to said central longitudinal axis as indicated by the arrow 305 in FIG. 3.

The pair of cables with converging projection lines may be attached to two separate attachment elements 103 or to the same attachment element configured to receive two different cable ends.

Figure 4A:
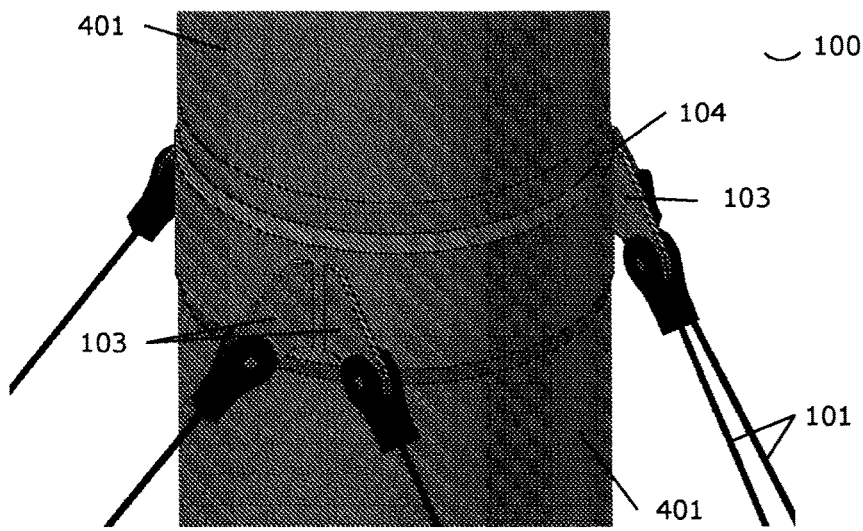
Figure 4B:
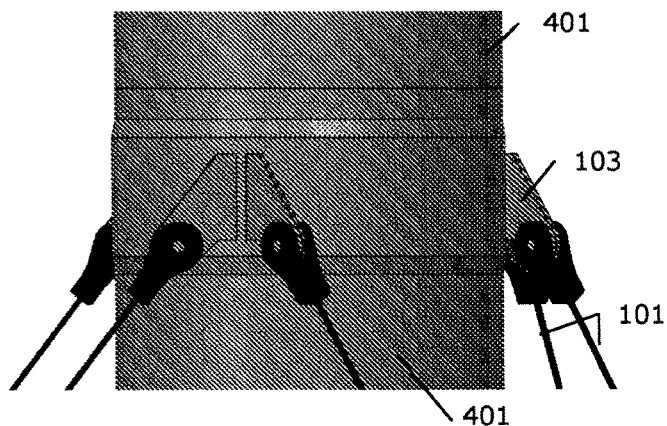

In FIGS. 4A and B are shown an embodiment of the cables 101 attached to a tower section 104 of the wind turbine tower 100 in a perspective view and as seen from the side, respectively. The tower section 104 onto which the cable ends are attached is here reinforced by a larger wall material thickness in order to better withstand the forces from the cables. As can be seen from the figures the outer diameter of the tower section 104 is larger than the outer diameter of the neighbouring tower sections 401. The tower sections are here joined by flanges abutting inside the tower (not shown).

Preferable the attachment elements are shaped such that the cable projection lines of each cable go up to and through the middle height of the attachment element to obtain an even stress distribution in the welding of the attachment element to the tower wall.

Figure 5:
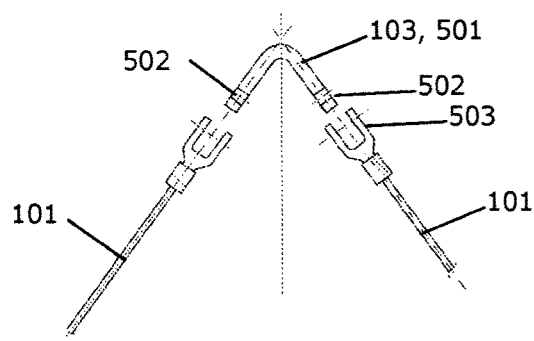
FIG. 5 shows an embodiment of an attachment element.

FIG. 5 shows a sketch of an attachment element 103 as seen from above. The attachment element is configured to receive two cables 101 and is formed by a bended plate 501 with one eye or aperture 502 at each end. Nooses 503 at the cable ends can then be attached to the eyes 502 by bolts or pins. The attachment element 103 is attached to the tower for example by welding or by mechanical fastening members such as bolts, rivets or the like, or may form an integral part of the tower wall.

Figure 6:
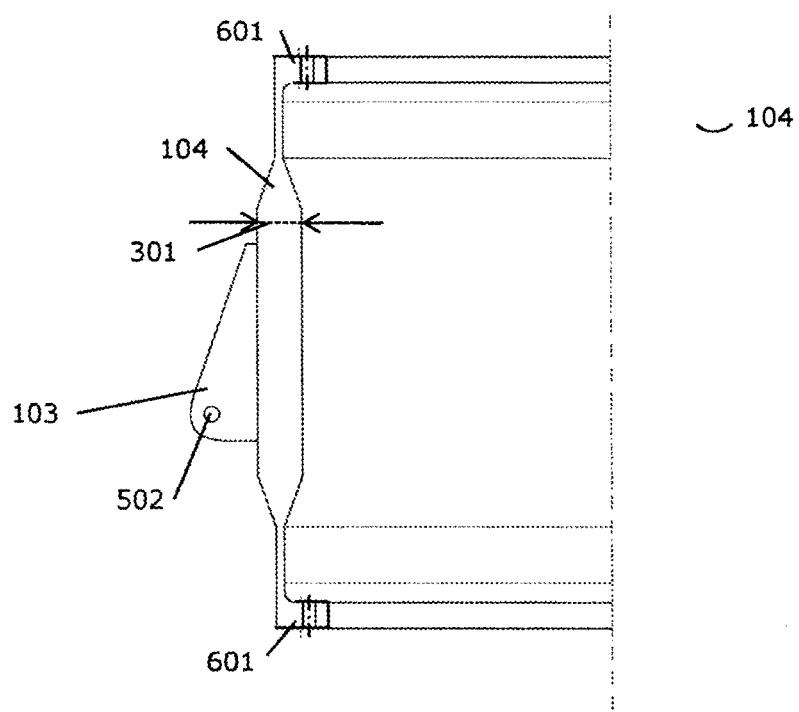
FIG. 6 shows a cross sectional view of a tower section with an attachment element, FIGS. 7A and B show an attachment of a cable to an attachment element and to an anchoring element, respectively.

In FIG. 6 is shown an attachment element 103 as attached to a tower section 104 and as seen in a cross sectional view from a side. The attachment element 103 is here formed as a plate element with an opening 502 for receiving a cable end. The wall thickness of the tower section 104 with the attachment elements has an increased thickness 301 adjacent to the attachment element 103. The tower section 104 comprises flanges 601 at both ends for joining of the tower section to other tower sections. The flanges 601 are to be connected by bolts.

Figures 7A, 7B:
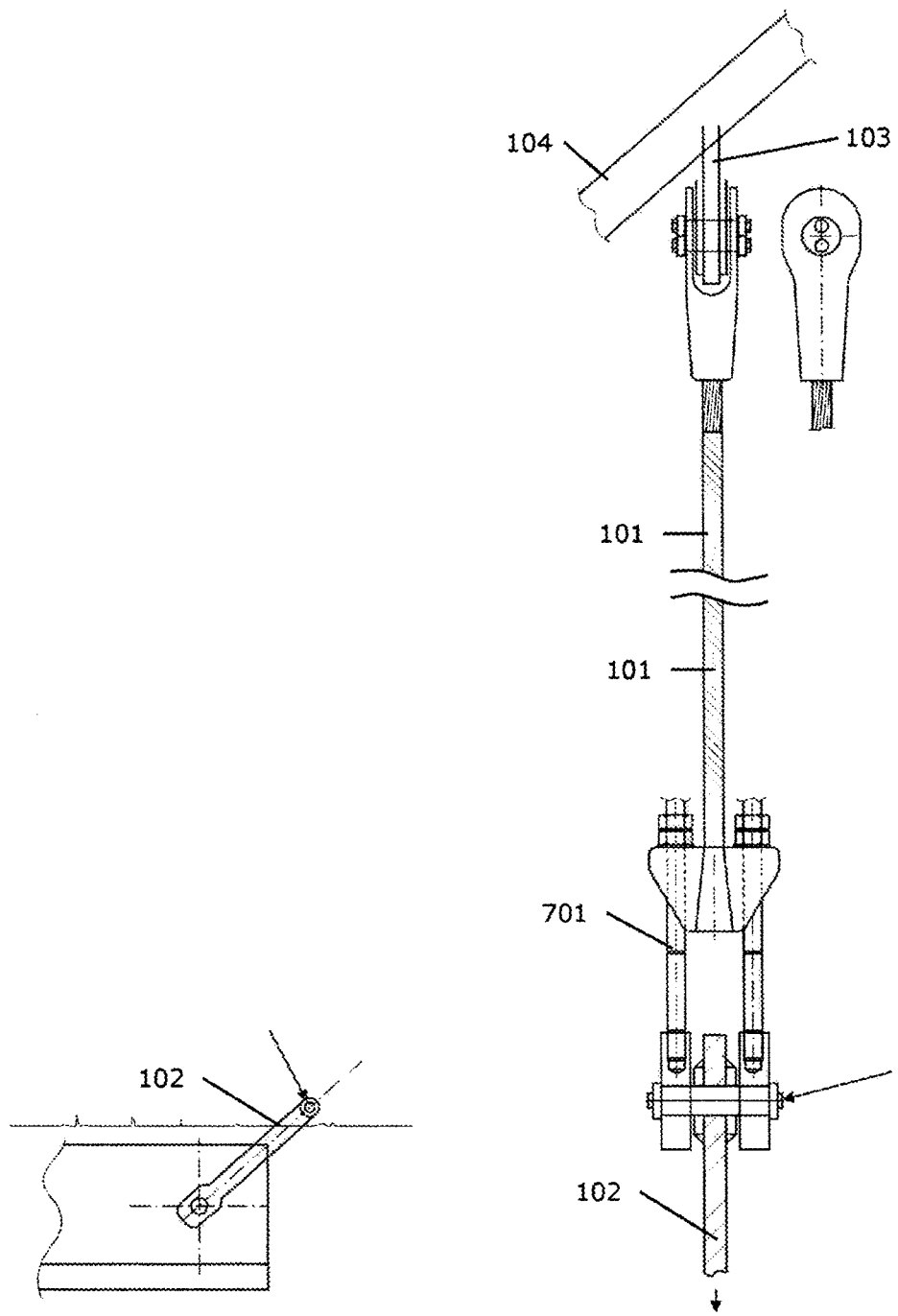

In FIG. 7B is shown in a top view an embodiment of the cable ends 101 as attached to an attachment element 103 at the tower section 104, and as attached in the other end to an anchor element 102. FIG. 7A shows the anchor element 102 from FIG. 7B in a side view. The cable can be tensioned by tensioning the bolts 701 appropriately at the anchor element 102.

Figure 8:
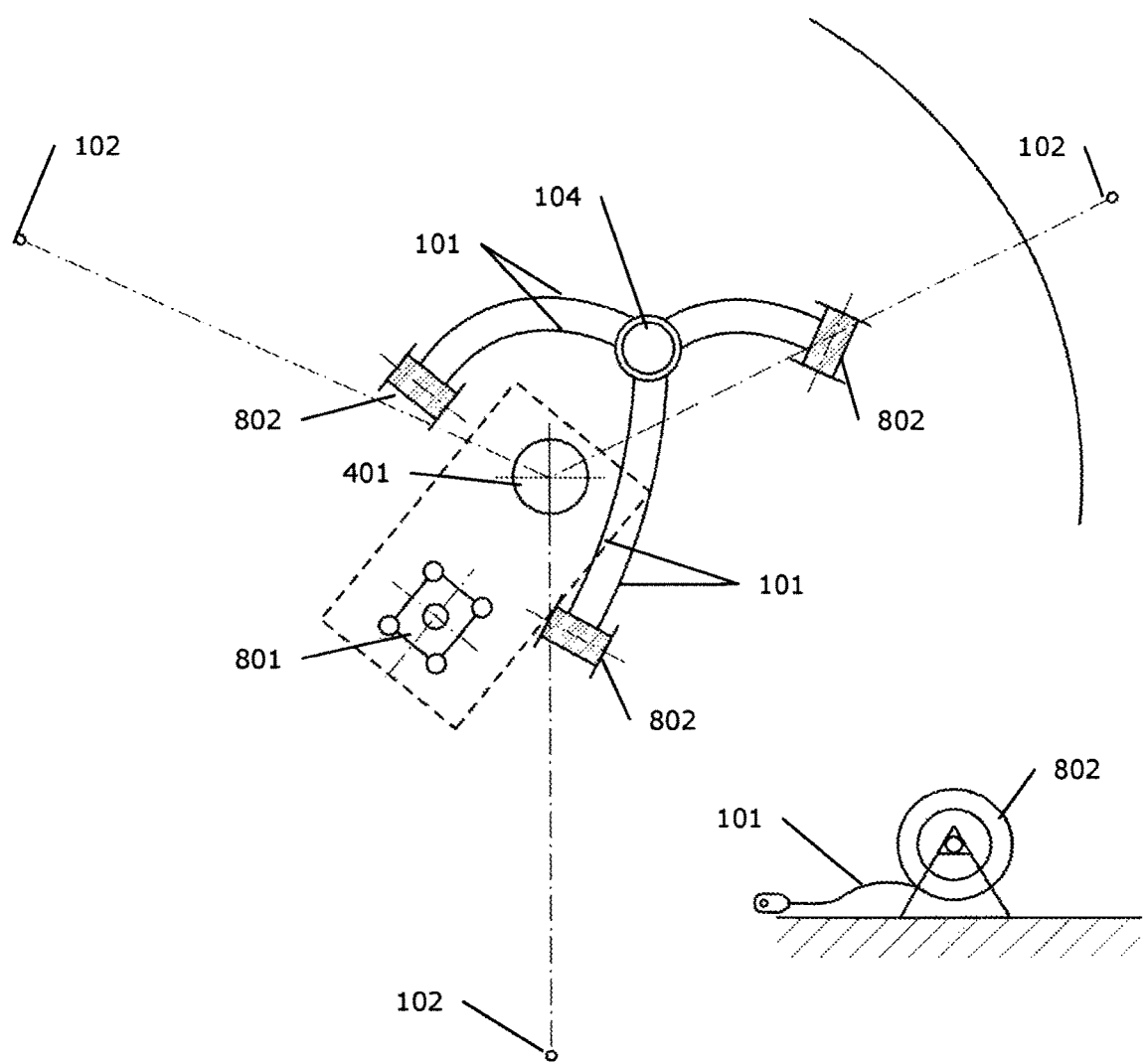
FIG. 8 is a sketch of a wind turbine tower during erection as seen from above.

FIG. 8 is a sketch of how the wind turbine tower can be erected and as seen in a top view. A first tower section 401 of the tower has been positioned and the cables 101 have been attached to the second tower section 104 optionally with a portion of the cables still being rolled onto cable drums 802. Here, the two cables to be attached to the same anchor element 102 are rolled onto the same cable drum 802. The set of cables may alternatively be rolled onto separate cable drums. In general the lengths of each of the cables in a set to be attached to the same anchor element are the same. Preferably, the anchor elements are all placed with the same distance to the wind turbine tower. However, even in that case the cable lengths may vary some length due to the possibility of level differences between the anchor elements. A crane 801 then lifts the second tower section 104 with the attached cables 101 onto the first tower section 401 and the tower sections are joined. The crane 801 may then advantageously be used to lift each cable drum 802 with the other cable ends out from the tower to the location of the anchoring elements 102 for attachment and tensioning of the cables. In this way the crane can lift the cables over trees or other types of vegetation or obstacles without having to clear a path on the ground.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A wind turbine tower configured to support a wind turbine nacelle and a rotor, said tower having a generally cylindrical tower wall and extending in a longitudinal direction along and about a central longitudinal axis;
   wherein said tower wall has an inner surface and an outer surface;
   and wherein a tower wall thickness extends between said inner surface and said outer surface in a radial direction from said central longitudinal axis;
   wherein said tower is tethered by a number of cables;
   wherein each cable extends between a first end anchored to an anchoring element and an opposite, second end attached to said tower at an attachment element affixed to the outer surface of the tower wall;
   and wherein two cables extending from two different anchoring elements are attached to the tower such that longitudinal projection lines from said second ends of two said cables converge at a convergence point;
   and wherein said convergence point lies at a location at a height and inside the tower wall thickness or inside the tower within a distance of three wall thicknesses from the wall inner surface as measured at the height and in a direction perpendicular to said central longitudinal axis.

2. The wind turbine tower according to claim 1, wherein the two cables are attached to the tower such that the convergence point lies at a location inside the tower wall thickness or inside the tower within a distance of one wall thickness from the wall inner surface measured at the height and in a direction perpendicular to said central longitudinal axis.

3. The wind turbine tower according to claim 1, wherein the two cables are attached to the tower such that the convergence point lies at a location within the tower thickness.

4. The wind turbine tower according to claim 1, wherein the attachment element forms an integral part of the tower wall or is attached to a surface of the tower wall by fastening means.

5. The wind turbine tower according to claim 1, wherein the attachment element is adapted to receive the second ends of the two different cables.

6. The wind turbine tower according to claim 5, wherein the attachment element is at least partly formed from a bended plate.

7. The wind turbine tower according to claim 1, wherein two cables are anchored to the same anchoring element and extend to different positions at the tower at essentially the same height of the tower.

8. The wind turbine tower according to claim 1, wherein the wind turbine tower comprises a number of anchoring elements and a number of attachment elements, and wherein each anchoring element is adapted to anchor at least two cables and each attachment element is adapted to receive two cables not extending from the same anchoring elements.

9. The wind turbine tower according to claim 1, wherein each cable is pre-tensioned to a value in the interval of 30-55% of their nominal strength.

10. The wind turbine tower according to claim 1, wherein the wind turbine tower comprises at least a first tower section and a second tower section joined to the first tower section, and wherein the cables are attached to the second tower section, and wherein the tower wall thickness of the second tower section is larger than the tower wall thickness of the first tower section.

11. The wind turbine tower according to claim 10, wherein the second tower section has an outer diameter larger than an outer diameter of the first tower section.

12. The wind turbine tower according to claim 10, wherein the second tower section has an inner diameter smaller than an inner diameter of the first tower section.

13. The wind turbine tower according to claim 10, wherein the first and second tower sections are joined by any of a flange connection, welding of adjoining or overlapping tower section portions, or bolting of overlapping tower section portions.

14. The wind turbine tower according to claim 1, wherein the cables are attached to a tower ring placed around the wind turbine tower.

15. A method of erecting a wind turbine tower tethered by a number of cables and configured to support a wind turbine nacelle and a rotor, and wherein the tower comprises a number of tower sections joined to each other, the method comprising:
   positioning a first tower section,
   attaching at least some of the tethering cables to a second tower section while the second tower section is on the ground,
   lifting the second tower section with the attached cables onto the first tower section, and
   joining the second tower section to the first,
   wherein the second tower section includes an attachment element, and the attaching at least some of the tethering cables to the second tower section further includes attaching an end of each of two cables to the attachment element, and
   wherein the two cables are attached to the attachment element such that a longitudinal projection line from each end of the two cables converge at a convergence point.

16. The method according to claim 15, wherein a third tower section is attached to the second tower section while the second tower section is on the ground.

17. The method according to claim 15, wherein the second tower section has a generally cylindrical wall with a wall thickness and an inner surface, the wall extending in a longitudinal direction and about a central longitudinal axis, and
   wherein the convergence point lies at a location at a height and inside the wall thickness or inside the second tower section within a distance of three wall thicknesses from the wall inner surface as measured at the height and in a direction perpendicular to the central longitudinal axis.

* * * * *